United States Patent
Bodapati et al.

(10) Patent No.: US 12,532,066 B2
(45) Date of Patent: Jan. 20, 2026

(54) MANAGING CONTROL OF CAMERAS IN A MULTI-CAMERA DEVICE

(71) Applicant: QUALCOMM Incorporated, San Diego, CA (US)

(72) Inventors: Sai Krishna Bodapati, Vijaywada (IN); Shubhobrata Dutta Choudhury, New Delhi (IN)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 18/358,824

(22) Filed: Jul. 25, 2023

(65) Prior Publication Data
US 2025/0039539 A1    Jan. 30, 2025

(51) Int. Cl.
H04N 23/60    (2023.01)
G06F 9/4401    (2018.01)
H04N 23/695    (2023.01)
H04N 23/90    (2023.01)

(52) U.S. Cl.
CPC .................... H04N 23/64 (2023.01)

(58) Field of Classification Search
CPC ...... H04N 23/64; H04N 23/90; H04N 23/695; G06F 9/4411
See application file for complete search history.

(56) References Cited

U.S. PATENT DOCUMENTS

| | | | |
|---|---|---|---|
| 10,212,326 B2 * | 2/2019 | Leung | G06F 9/52 |
| 10,792,813 B1 | 10/2020 | Coe et al. | |
| 2005/0044205 A1 | 2/2005 | Sankaranarayan et al. | |
| 2005/0268302 A1 | 12/2005 | Geib et al. | |
| 2010/0231754 A1 | 9/2010 | Wang et al. | |
| 2012/0263125 A1 | 10/2012 | Tejaswini et al. | |
| 2013/0111025 A1 | 5/2013 | Sampathkumaran et al. | |
| 2018/0146127 A1 | 5/2018 | Leung et al. | |
| 2018/0146139 A1 | 5/2018 | Leung et al. | |
| 2019/0007605 A1 | 1/2019 | Choe et al. | |
| 2021/0279479 A1 * | 9/2021 | Vaidya | G06V 20/64 |

FOREIGN PATENT DOCUMENTS

WO    2023088040 A1    5/2023

OTHER PUBLICATIONS

International Search Report and Written Opinion—PCT/US2024/031496—ISA/EPO—Sep. 3, 2024.

* cited by examiner

*Primary Examiner* — Ahmed A Berhan
(74) *Attorney, Agent, or Firm* — Polsinelli LLP/QUALCOMM Incorporated

(57) ABSTRACT

Systems and techniques are described herein for managing control of cameras. For instance, a method for managing control of cameras is provided. The method may include receiving data output by two or more cameras of a plurality of cameras of a device; determining one or more settings for operation of the plurality of cameras based on the data; granting a first application running on the device control of a first camera of the plurality of cameras; receiving a request from a second application running on the device to control one or more cameras of the plurality of cameras; and granting the second application control of one or more unused cameras of the plurality of cameras.

30 Claims, 7 Drawing Sheets

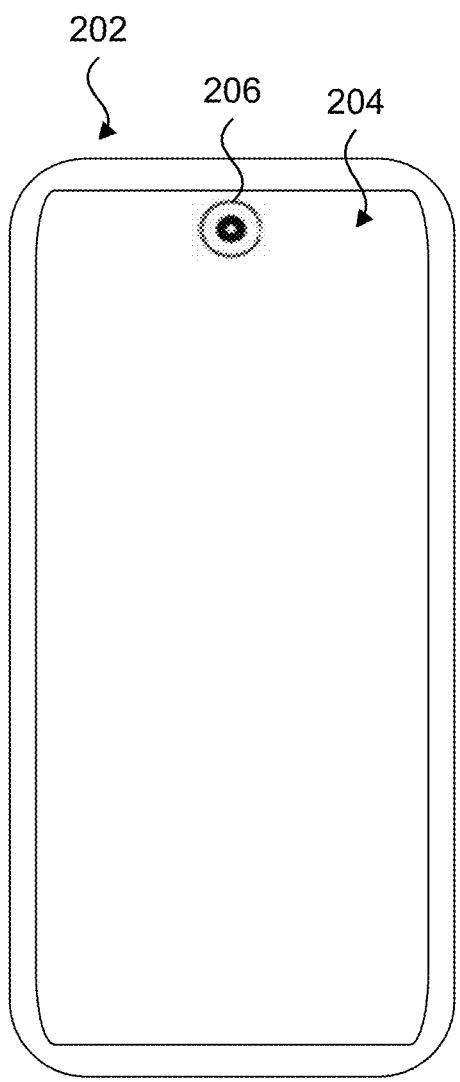
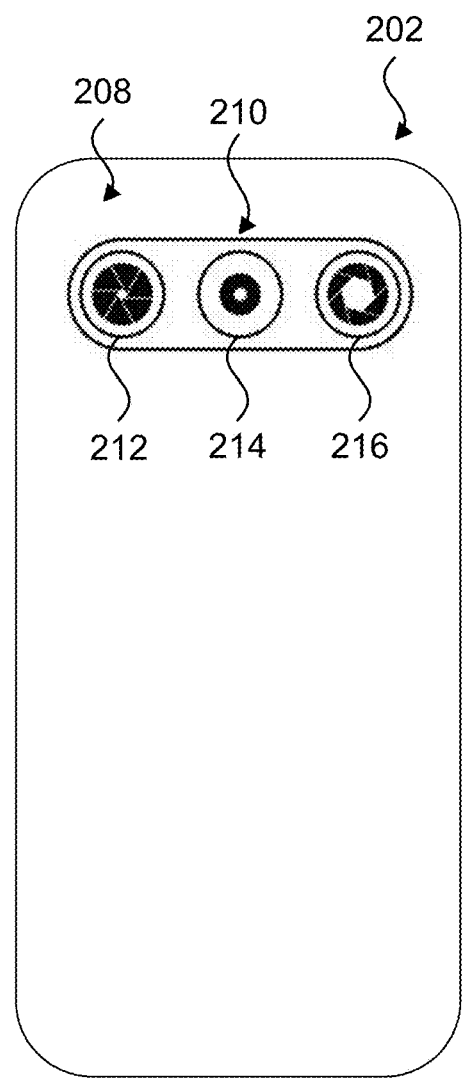
FIG. 2A
FIG. 2B

MANAGING CONTROL OF CAMERAS IN A MULTI-CAMERA DEVICE

TECHNICAL FIELD

The present disclosure generally relates to systems and techniques for managing control of cameras in a multi-camera device. For example, aspects of the present disclosure include systems and techniques for managing which application (of two or more applications running on a device) are granted control of which cameras of the multi-camera device that includes two or more cameras.

BACKGROUND

A camera may convert light into image data representative of a field of view of the camera. Some devices may include multiple cameras. For example, a smart phone may include a front camera (e.g., on a front or screen face of the smart phone) and one or more back cameras (e.g., on a back face of the smart phone). A smart phone may run multiple applications. In many instances one application is running in the "foreground" and other applications are relegated to run in the "background." In such instances, the application running in the foreground may be granted control of all of the cameras of the smart phone.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described herein for managing control of cameras. According to at least one example, an apparatus for managing control of cameras is provided. The apparatus includes at least one memory and at least one processor coupled to the memory. The at least one processor is configured to: receive data output by two or more cameras of a plurality of cameras of a device; determine one or more settings for operation of the plurality of cameras based on the data; grant a first application running on the device control of a first camera of the plurality of cameras; receive a request from a second application running on the device to control one or more cameras of the plurality of cameras; and grant the second application control of one or more unused cameras of the plurality of cameras.

In another example, a method for managing control of cameras is provided. The method includes: receiving data output by two or more cameras of a plurality of cameras of a device; determining one or more settings for operation of the plurality of cameras based on the data; granting a first application running on the device control of a first camera of the plurality of cameras; receiving a request from a second application running on the device to control one or more cameras of the plurality of cameras; and granting the second application control of one or more unused cameras of the plurality of cameras.

In another example, a non-transitory computer-readable medium is provided that has stored thereon instructions that, when executed by at least one processor, cause the at least one processor to: receive data output by two or more cameras of a plurality of cameras of a device; determine one or more settings for operation of the plurality of cameras based on the data; grant a first application running on the device control of a first camera of the plurality of cameras; receive a request from a second application running on the device to control one or more cameras of the plurality of cameras; and grant the second application control of one or more unused cameras of the plurality of cameras.

As another example, an apparatus is provided. The apparatus includes means for receiving data output by two or more cameras of a plurality of cameras of a device; means for determining one or more settings for operation of the plurality of cameras based on the data; means for granting a first application running on the device control of a first camera of the plurality of cameras; means for receiving a request from a second application running on the device to control one or more cameras of the plurality of cameras; and means for granting the second application control of one or more unused cameras of the plurality of cameras.

Systems and techniques are described herein for managing control of cameras. According to at least one example, an apparatus for managing control of cameras is provided. The apparatus includes at least one memory and at least one processor coupled to the memory. The at least one processor is configured to: grant a first application running on a device control of a first camera of a plurality of cameras of the device; control the first camera based on one or more settings; responsive to a request from the first application to control a second camera of the plurality of cameras, grant the first application control of the second camera; control the second camera based on the one or more settings; receive a request from a second application running on the device to control one or more cameras of the plurality of cameras; and grant the second application control of one or more unused cameras of the plurality of cameras.

In another example, a method for managing control of cameras is provided. The method includes: granting a first application running on a device control of a first camera of a plurality of cameras of the device; controlling the first camera based on one or more settings; responsive to a request from the first application to control a second camera of the plurality of cameras, granting the first application control of the second camera; controlling the second camera based on the one or more settings; receiving a request from a second application running on the device to control one or more cameras of the plurality of cameras; and granting the second application control of one or more unused cameras of the plurality of cameras.

In another example, a non-transitory computer-readable medium is provided that has stored thereon instructions that, when executed by at least one processor, cause the at least one processor to: grant a first application running on a device control of a first camera of a plurality of cameras of the device; control the first camera based on one or more settings; responsive to a request from the first application to control a second camera of the plurality of cameras, grant the first application control of the second camera; control the second camera based on the one or more settings; receive a request from a second application running on the device to control one or more cameras of the plurality of cameras; and grant the second application control of one or more unused cameras of the plurality of cameras.

As another example, an apparatus is provided. The apparatus includes means for granting a first application running on a device control of a first camera of a plurality of cameras of the device; means for controlling the first camera based on one or more settings; means for responsive to a request from the first application to control a second camera of the plurality of cameras, granting the first application control of the second camera; means for controlling the second camera based on the one or more settings; means for receiving a request from a second application running on the device to control one or more cameras of the plurality of cameras; and means for granting the second application control of one or more unused cameras of the plurality of cameras.

In some aspects, one or more of the apparatuses described herein is, can be part of, or can include a mobile device (e.g., a mobile telephone or so-called "smart phone", a tablet computer, or other type of mobile device), an extended reality device (e.g., a virtual reality (VR) device, an augmented reality (AR) device, or a mixed reality (MR) device), a vehicle (or a computing device or system of a vehicle), a smart or connected device (e.g., an Internet-of-Things (IoT) device), a wearable device, a personal computer, a laptop computer, a video server, a television (e.g., a network-connected television), a robotics device or system, or other device. In some aspects, each apparatus can include an image sensor (e.g., a camera) or multiple image sensors (e.g., multiple cameras) for capturing one or more images. In some aspects, each apparatus can include one or more displays for displaying one or more images, notifications, and/or other displayable data. In some aspects, each apparatus can include one or more speakers, one or more light-emitting devices, and/or one or more microphones. In some aspects, each apparatus can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures:

FIG. 2A is a diagram illustrating a view of a front face of an example device.

FIG. 2B is a diagram illustrating a view of a back face of the device of FIG. 2A.

DETAILED DESCRIPTION

Figure 1:
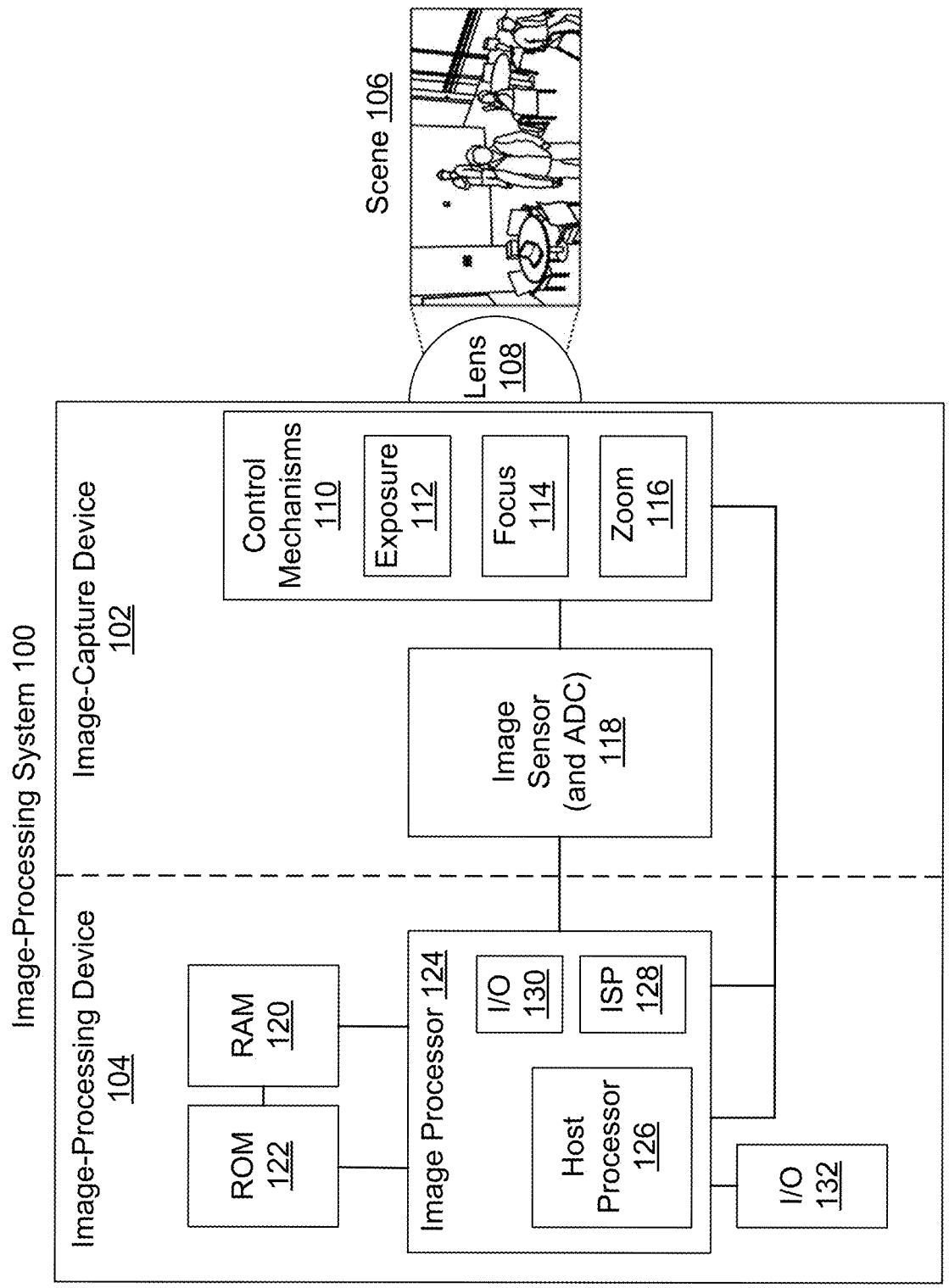
FIG. 1 is a block diagram illustrating an example architecture of an image-processing system, according to various aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

A camera is a device that receives light and captures image frames, such as still images or video frames, using an image sensor. Cameras can be configured with a variety of image-capture settings and/or image-processing settings to alter the appearance of images captured thereby. Image-capture settings may be determined and applied before and/or while an image is captured, such as ISO, exposure time (also referred to as exposure, exposure duration, or shutter speed), aperture size, (also referred to as f/stop), focus, and gain (including analog and/or digital gain), among others. Moreover, image-processing settings can be configured for post-processing of an image, such as alterations to contrast, brightness, saturation, sharpness, levels, curves, and colors, among others.

As described above, some devices (e.g., smart phones) may include multiple cameras (e.g., one or more front cameras on a front face of the device and one or more back cameras on a back face of the device). Such devices may include one application programming interface (API) to control all of the cameras. For example, the API may control settings (e.g., image-capture setting and/or image-processing setting) of all of the cameras. Controlling all of the cameras using one API allows the API to provide consistency to applications using the cameras.

For example, a device may include an ultrawide-angle camera with a zoom range of 0.5× to 1×, a wide-angle camera with a zoom range of 1× to 3×, and a telephoto camera with a zoom range of 3× to 10×. An API of the device can perform zoom-transition handling to provide an application running on the device with consistent image data while transitioning between cameras. As an example, the application may send a request to the API for image data. The application may be capturing video frames while zooming in (e.g., from a 1× zoom setting to a 5× zoom setting). The API may control the cameras and provide the application with image data from a camera. The API may initially provide the application with image data from the wide-angle camera. The API may then transition to providing the application with image data from the telephoto camera. While transitioning between cameras, the API may control the image-capture settings and/or image-capture settings of both the wide-angle camera and the telephoto camera such that the image data is consistent through the transition. For example, the application may be capturing video frames while zooming in.

The API may cause the image-capture settings and/or image-processing settings of the wide-angle camera and of the telephoto camera to be related such that the last frame provided by the wide-angle camera (before the API transitions to providing image data from the telephoto camera) is substantially the same (e.g., in terms of brightness and focus) as the first frame provided by the telephoto camera. By doing this, the API may avoid a flicker that may otherwise occur when transitioning between cameras (e.g., the flicker may be a result of the camera that is transitioned to taking one or more frames to adjust its image-capture settings and/or image-processing settings for the brightness and/or focus of the scene).

To provide smooth zoom transitions, the API may receive image data from multiple cameras of the device and determine image-capture settings and/or image-capture settings for each of cameras of the device based on the image data. For example, the API may receive image data from the ultrawide-angle camera, the wide-angle camera, and the telephoto camera (e.g., even when the API is not providing image data from one or more of the cameras to an application). The API may determine image-capture settings and/or image-processing settings for all of the cameras of the device based on the image data.

For example, based on image data from the cameras, the API may determine image-capture settings and/or image-processing settings for the cameras such that if a transition between cameras were to occur, the transition would be smooth (e.g., images captured immediately before and immediately after the transition would be substantially the same in terms of brightness and/or focus). The API may determine image-capture settings, such as ISO, exposure time, aperture size, focus, and/or gain. The image-capture settings between cameras may be related, and may, or may not, be the same. For example, to capture images of substantially the same brightness, the exposure time of a wide-angle camera may need to be lower than the exposure time of a telephoto camera. Additionally, or alternatively, the API may determine image-processing settings or super settings, such as settings for automatic exposure control (AEC), automatic white balance (AWB), and/or autofocus (AF). In the present disclosure, the term "super settings" may refer to higher-level settings that may be used to determine image-capture settings. For example, an AEC super setting may be determined and one or more image-capture settings may be determined based on the AEC super setting.

As described above, multi-camera devices (e.g., smart phones) may run multiple applications at the same time (e.g., with one application running in the "foreground" and other applications relegated to the "background"). A conventional API may control all cameras of the device based on requests from one application. Because an API controls all of the cameras of a multi-camera device (e.g., to provide zoom transition handling), the one application interfacing with the API may control all of the cameras of the device, even if the one application is only receiving image data from one camera at a time. When an application running in the foreground requests a camera, the application may interface with the API and be granted control of all of the cameras of the device. This may prevent other applications (e.g., applications running in the background) from receiving image data from the cameras and/or from controlling the cameras, even if the application in the foreground is controlling only one camera. For example, a user of a smart phone may be in a video call using a first application. The first application may be interfacing with the API to receive image data from a front camera of a smart phone. If the user starts a second application (e.g., a camera application to capture a photo using a back camera of the smart phone), the second application may interface with the API. The API may grant the second application control of all of the cameras of the smart phone which may interrupt the image data being provided to the first application.

Systems, apparatuses, methods (also referred to as processes), and computer-readable media (collectively referred to herein as "systems and techniques") are described herein for arbitrating control of cameras of a multi-camera device. For example, the systems and techniques described herein may grant a first application running on a device (e.g., a multi-camera device) control of a first camera of a plurality of cameras of the device. The systems and techniques may receive a request from a second application running on the device to control one or more cameras of the plurality of cameras. The systems and techniques may grant the second application control of one or more unused cameras of the plurality of cameras.

In an illustrative example, a user of a smart phone may be in a video call using a first application. The first application may be interfacing with an API to receive image data from a front camera of a smart phone. If the user starts a second application (e.g., a camera application to capture a photo using a back camera of the smart phone), the second application may interface with the API. According to the systems and techniques, the API may grant the second application control of an unused camera of the smart phone without interrupting the image data being provided to the first application from the first camera and/or without interrupting the control of the first camera by the first application.

The systems and techniques may be implemented in an API. The systems and techniques may enable applications to transition between cameras. For example, the systems and techniques may provide image data to an application from a first camera then transition to providing image data from a second camera. The systems and techniques may cause the transition to be smooth (e.g., the systems and techniques may be capable of performing zoom-transition handling). For example, the systems and techniques may receive data output by two or more cameras of the plurality of cameras (e.g., image data) and determine one or more settings for operation of the plurality of cameras based on the data. For example, based on image data from two or more cameras of the plurality of cameras, the systems and techniques may determine settings related to ISO, exposure time, aperture size, focus, gain, AEC, AWB, AF, and/or combinations thereof. For example, while the first application controls the first camera, the systems and techniques may receive image data from the unused cameras of the device and may determine settings for the operation of unused cameras based on the image data. As another example, the systems and techniques may grant the first application control of a first camera of a plurality of cameras of the device. The systems and techniques may control the first camera based on one or more settings. Further, the systems and techniques may, responsive to a request from the first application to control a second camera, grant the first application control of the second camera. The systems and techniques may control the second camera based on the one or more settings.

Various aspects of the application will be described with respect to the figures below.

FIG. 1 is a block diagram illustrating an example architecture of an image-processing system 100, according to various aspects of the present disclosure. The image-processing system 100 includes various components that are used to capture and process images, such as an image of a scene 106. The image-processing system 100 can capture image frames (e.g., still images or video frames). In some cases, the lens 108 and image sensor 118 (which may include an analog-to-digital converter (ADC)) can be associated with an optical axis. In one illustrative example, the photosensitive area of the image sensor 118 (e.g., the photodiodes) and the lens 108 can both be centered on the optical axis.

In some examples, the lens 108 of the image-processing system 100 faces a scene 106 and receives light from the scene 106. The lens 108 bends incoming light from the scene toward the image sensor 118. The light received by the lens 108 then passes through an aperture of the image-processing system 100. In some cases, the aperture (e.g., the aperture size) is controlled by one or more control mechanisms 110. In other cases, the aperture can have a fixed size.

The one or more control mechanisms 110 can control exposure, focus, and/or zoom based on information from the image sensor 118 and/or information from the image processor 124. In some cases, the one or more control mechanisms 110 can include multiple mechanisms and components. For example, the control mechanisms 110 can include one or more exposure-control mechanisms 112, one or more focus-control mechanisms 114, and/or one or more zoom-control mechanisms 116. The one or more control mechanisms 110 may also include additional control mechanisms besides those illustrated in FIG. 1. For example, in some cases, the one or more control mechanisms 110 can include control mechanisms for controlling analog gain, flash, HDR, depth of field, and/or other image capture properties.

The focus-control mechanism 114 of the control mechanisms 110 can obtain a focus setting. In some examples, focus-control mechanism 114 stores the focus setting in a memory register. Based on the focus setting, the focus-control mechanism 114 can adjust the position of the lens 108 relative to the position of the image sensor 118. For example, based on the focus setting, the focus-control mechanism 114 can move the lens 108 closer to the image sensor 118 or farther from the image sensor 118 by actuating a motor or servo (or other lens mechanism), thereby adjusting the focus. In some cases, additional lenses may be included in the image-processing system 100. For example, the image-processing system 100 can include one or more microlenses over each photodiode of the image sensor 118. The microlenses can each bend the light received from the lens 108 toward the corresponding photodiode before the light reaches the photodiode.

In some examples, the focus setting may be determined via contrast detection autofocus (CDAF), phase detection autofocus (PDAF), hybrid autofocus (HAF), or some combination thereof. The focus setting may be determined using the control mechanism 110, the image sensor 118, and/or the image processor 124. The focus setting may be referred to as an image capture setting and/or an image processing setting. In some cases, the lens 108 can be fixed relative to the image sensor and the focus-control mechanism 114.

The exposure-control mechanism 112 of the control mechanisms 110 can obtain an exposure setting. In some cases, the exposure-control mechanism 112 stores the exposure setting in a memory register. Based on the exposure setting, the exposure-control mechanism 112 can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 118 (e.g., ISO speed or film speed), analog gain applied by the image sensor 118, or any combination thereof. The exposure setting may be referred to as an image capture setting and/or an image processing setting.

The zoom-control mechanism 116 of the control mechanisms 110 can obtain a zoom setting. In some examples, the zoom-control mechanism 116 stores the zoom setting in a memory register. Based on the zoom setting, the zoom-control mechanism 116 can control a focal length of an assembly of lens elements (lens assembly) that includes the lens 108 and one or more additional lenses. For example, the zoom-control mechanism 116 can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 108 in some cases) that receives the light from the scene 106 first, with the light then passing through a focal zoom system between the focusing lens (e.g., lens 108) and the image sensor 118 before the light reaches the image sensor 118. The focal zoom system may, in some cases, include two positive (e.g., converging, convex) lenses of equal or similar focal length (e.g., within a threshold difference of one another) with a negative (e.g., diverging, concave) lens between them. In some cases, the zoom-control mechanism 116 moves one or more of the lenses in the focal zoom system, such as the negative lens and one or both of the positive lenses. In some cases, zoom-control mechanism 116 can control the zoom by capturing an image from an image sensor of a plurality of image sensors (e.g., including image sensor 118) with a zoom corresponding to the zoom setting. For example, the image-processing system 100 can include a wide-angle image sensor with a relatively low zoom and a telephoto image sensor with a greater zoom. In some cases, based on the selected zoom setting, the zoom-control mechanism 116 can capture images from a corresponding sensor.

The image sensor 118 includes one or more arrays of photodiodes or other photosensitive elements. Each photodiode measures an amount of light that eventually corresponds to a particular pixel in the image produced by the image sensor 118. In some cases, different photodiodes may be covered by different filters. In some cases, different photodiodes can be covered in color filters, and may thus measure light matching the color of the filter covering the photodiode. Various color filter arrays can be used such as, for example and without limitation, a Bayer color filter array, a quad color filter array (QCFA), and/or any other color filter array.

In some cases, the image sensor 118 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 118 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 110 may be included instead or additionally in the image sensor 118. The image sensor 118 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 6:
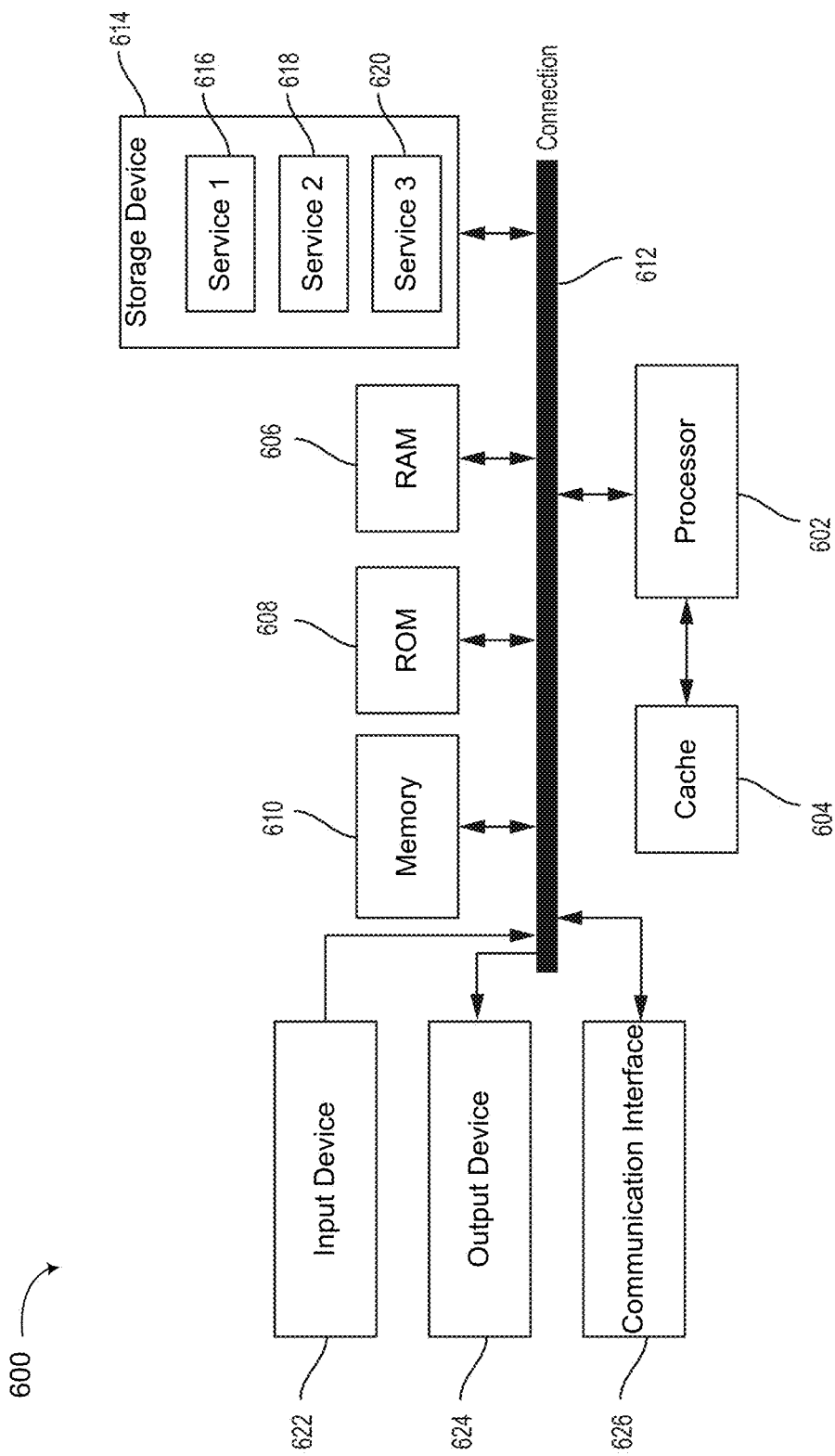
FIG. 6 is a block diagram illustrating an example computing-device architecture of an example computing device which can implement the various techniques described herein.

The image processor 124 may include one or more processors, such as one or more image signal processors (ISPs) (including ISP 128), one or more host processors (including host processor 126), and/or one or more of any other type of processor discussed with respect to the computing-device architecture 600 of FIG. 6. The host processor 126 can be a digital signal processor (DSP) and/or other type of processor. In some implementations, the image processor 124 is a single integrated circuit or chip (e.g., referred to as a system-on-chip or SoC) that includes the host processor 126 and the ISP 128. In some cases, the chip can also include one or more input/output ports (e.g., input/output (I/O) ports 130), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 130 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General-Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 126 can communicate with the image sensor 118 using an I2C port, and the ISP 128 can communicate with the image sensor 118 using an MIPI port.

The image processor 124 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 124 may store image frames and/or processed images in random-access memory (RAM) 120, read-only memory (ROM) 122, a cache, a memory unit, another storage device, or some combination thereof.

Various input/output (I/O) devices 132 may be connected to the image processor 124. The I/O devices 132 can include a display screen, a keyboard, a keypad, a touchscreen, a trackpad, a touch-sensitive surface, a printer, any other output devices, any other input devices, or any combination thereof. In some cases, a caption may be input into the image-processing device 104 through a physical keyboard or keypad of the I/O devices 132, or through a virtual keyboard or keypad of a touchscreen of the I/O devices 132. The I/O devices 132 may include one or more ports, jacks, or other connectors that enable a wired connection between the image-processing system 100 and one or more peripheral devices, over which the image-processing system 100 may receive data from the one or more peripheral device and/or transmit data to the one or more peripheral devices. The I/O devices 132 may include one or more wireless transceivers that enable a wireless connection between the image-processing system 100 and one or more peripheral devices, over which the image-processing system 100 may receive data from the one or more peripheral device and/or transmit data to the one or more peripheral devices. The peripheral devices may include any of the previously-discussed types of the I/O devices 132 and may themselves be considered I/O devices 132 once they are coupled to the ports, jacks, wireless transceivers, or other wired and/or wireless connectors.

In some cases, the image-processing system 100 may be a single device. In some cases, the image-processing system 100 may be two or more separate devices, including an image-capture device 102 (e.g., a camera) and an image-processing device 104 (e.g., a computing device coupled to the camera). In some implementations, the image-capture device 102 and the image-capture device 102 may be coupled together, for example via one or more wires, cables, or other electrical connectors, and/or wirelessly via one or more wireless transceivers. In some implementations, the image-capture device 102 and the image-processing device 104 may be disconnected from one another.

As shown in FIG. 1, a vertical dashed line divides the image-processing system 100 of FIG. 1 into two portions that represent the image-capture device 102 and the image-processing device 104, respectively. The image-capture device 102 includes the lens 108, control mechanisms 110, and the image sensor 118. The image-processing device 104 includes the image processor 124 (including the ISP 128 and the host processor 126), the RAM 120, the ROM 122, and the I/O device 132. In some cases, certain components illustrated in the image-capture device 102, such as the ISP 128 and/or the host processor 126, may be included in the image-capture device 102. In some examples, the image-processing system 100 can include one or more wireless transceivers for wireless communications, such as cellular network communications, 802.11 wi-fi communications, wireless local area network (WLAN) communications, or some combination thereof.

The image-processing system 100 can be part of, or implemented by, a single computing device or multiple computing devices. In some examples, the image-processing system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a laptop or notebook computer, a tablet computer, a set-top box, a smart television, a display device, a game console, an XR device (e.g., an HMD, smart glasses, etc.), an IoT (Internet-of-Things) device, a smart wearable device, a video streaming device, an Internet Protocol (IP) camera, or any other suitable electronic device(s).

While the image-processing system 100 is shown to include certain components, one of ordinary skill will appreciate that the image-processing system 100 can include more components than those shown in FIG. 1. The components of the image-processing system 100 can include software, hardware, or one or more combinations of software and hardware. For example, in some implementations, the components of the image-processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image-processing system 100.

In some examples, the computing-device architecture 600 shown in FIG. 6 and further described below can include the image-processing system 100, the image-capture device 102, the image-processing device 104, or a combination thereof.

FIG. 2A is a diagram illustrating a view of a front face 204 of an example device 202. FIG. 2B is a diagram illustrating a view of a back face 208 of device 202. As can be seen in FIG. 2A, device 202 includes a front camera 206 on front face 204. As can be seen in FIG. 2B, device 202 includes back cameras 210 on back face 208. As an example, back cameras 210 includes a telephoto camera 212, a wide-angle camera 214, and an ultrawide-angle camera 216. The number of cameras of device 202 is provided as an example. Other devices may include any number of cameras and the cameras may be arranged anywhere on the devices. For example, a device may include two or more front cameras, two or more back cameras, and/or cameras on other surfaces (e.g., sides) of the device.

Each of front camera 206, telephoto camera 212, wide-angle camera 214, and ultrawide-angle camera 216 may be, or may include, an instance of image-capture device 102 of FIG. 1. For example, each of front camera 206, telephoto camera 212, wide-angle camera 214, and ultrawide-angle camera 216 may individually include a lens (e.g., lens 108), a control mechanism (e.g., control mechanism 110), and an image sensor (e.g., image sensor 118).

In some cases, device 202 may include multiple instances of image-processing device 104 and/or of image processor 124. For example, device 202 may include an instance of image-processing device 104 (or of image processor 124) for each of front camera 206, telephoto camera 212, wide-angle camera 214, and ultrawide-angle camera 216. In such cases, each of front camera 206, telephoto camera 212, wide-angle camera 214, and ultrawide-angle camera 216 may provide image data to a respective instance of image-processing device 104 (or a respective instance of image processor 124). The respective instances of image-processing device 104 (or of image processor 124) may process the image data to generate a final image. As another example, device 202 may include fewer instances of image-processing device 104 (or image processor 124) than there are cameras of device 202. In such cases, multiple ones of front camera 206, telephoto camera 212, wide-angle camera 214, and ultrawide-angle camera 216 may provide image data to the same image-processing device 104 (or image processor 124). For example, back cameras 210 may all provide data to one instance of image-processing device 104 (or image processor 124) and front camera 206 may provide data to another instance of image-processing device 104 (or image processor 124). In other cases, device 202 may include one instance of image-processing device 104 (or image processor 124). In such cases, all of front camera 206, telephoto camera 212, wide-angle camera 214, and ultrawide-angle camera 216 may provide image data to the instance of image-processing device 104 (or image processor 124).

Figure 3:
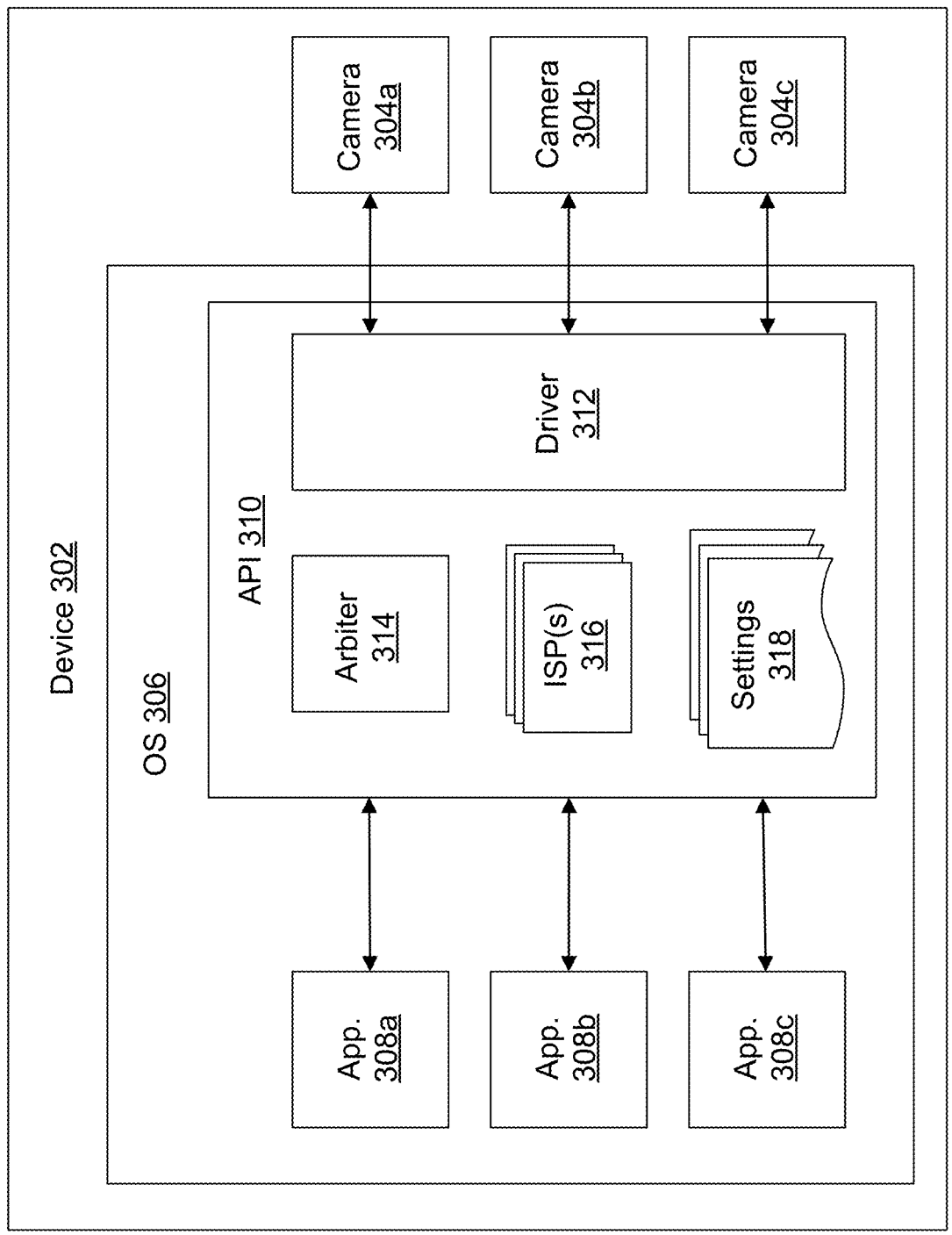
FIG. 3 is a diagram illustrating an example device that may manage control of cameras, according to various aspects of the present disclosure.

FIG. 3 is a diagram illustrating an example device 302 that may manage control of cameras 304, according to various aspects of the present disclosure. For example, device 302 may arbitrate between applications 308 as applications 308 request to control cameras 304.

Device 302 may include camera 304a, camera 304b, and camera 304c (which may be referred to collectively as cameras 304). Three cameras 304 are illustrated and described in device 302 for descriptive purposes. A device according to various aspects of the present disclosure may include any number of cameras. Each of cameras 304 may be an instance of image-capture device 102 of FIG. 1. Each of front camera 206, telephoto camera 212, wide-angle camera 214, and ultrawide-angle camera 216 may be an example of one of cameras 304.

Device 302 may run an operating system 306 (OS 306). OS 306 may be software that may run on one or more processors of device 302. OS 306 may manage hardware of device 302. Further, OS 306 may execute applications 308 and API 310.

Application 308a, application 308b, and application 308c (which may be referred to collectively as applications 308) are provided as examples of applications that may be running on device 302. Applications 308 may be software that may run on one or more processors of device 302. OS 306 may execute applications 308. Applications 308 may send requests to API 310 to receive image data from one or more of cameras 304 and/or to control one or more of cameras 304. In some cases, applications 308 may request image data from, or control of, a specific one of cameras 304. In other cases, applications 308 may generally request image data from any one of cameras 304, or from any one of a group of cameras 304 (e.g., from cameras 304 arranged on a surface of device 302). Applications 308 may perform functions related to capturing images and/or capturing video. For example, applications 308 may include a camera application, a video call or streaming application, a barcode or quick response (QR) code scanner application, any combination thereof, and/or other applications.

Application programming interface 310 (API 310) may be software configured to provide an interface between applications 308 and cameras 304. API 310 may be software running on one or more processors of device 302. OS 306 may execute API 310. OS 306 may enable applications 308 to communicate with API 310. API 310 may receive requests (and/or control settings) from applications 308, control cameras 304 based on the requests, receive image data from cameras 304, and provide output data (e.g., processed image data) responsive to the requests. For example, application 308a may send a request to API 310. The request may be a request for image data from one or more of cameras 304. In some cases, the request may specify a particular one or more of cameras 304 (e.g., camera 304a and/or camera 304b). In some cases, the request may include control settings (e.g., image-capture settings and/or image-processing settings. API 310 may control one or more of cameras 304 based on the request. For example, API 310 may control camera 304a based on the control settings to generate the requested image data. In some cases, API 310 may process the image data according to the request (e.g., controlling one of image signal processors 316 (ISP(s) 316) based on image-processing settings of the request). API 310 may return output data (e.g., the requested and/or processed image data) to application 308*a*. API 310 may allow applications 308 running on device 302 to receive image data from cameras 304 without needing details regarding cameras 304. For example, application 308*a* may request image data at a particular zoom setting and with a particular exposure time without application 308*a* needing details regarding commands for controlling any of cameras 304.

API 310 may use driver 312 to control and/or to receive data from cameras 304. In some aspects, API 310 may include driver 312. Driver 312 may be software running on one or more processors of device 302. Additionally, or alternatively, driver 312 may include one or more hardware elements (e.g., drivers configured to provide control voltages to cameras 304). Though illustrated as one element, in some cases, driver 312 may be, or may include, a number of individual drivers (e.g., one driver for each of cameras 304). Driver 312 may be configured to provide commands to cameras 304. For example, driver 312 may be configured with information regarding specific command signals and/or voltages used to control cameras 304. Additionally, or alternatively, driver 312 may be configured to receive image data (e.g., raw image data) from cameras 304. For example, driver 312 may be configured with information regarding sensors of cameras 304 (e.g., sizes of the sensors) and/or data formats of the image data provided by cameras 304.

API 310 may use one or more image signal processors 316 (ISP(s) 316) to process image data (e.g., raw image data) from cameras 304 to generate processed image data. In some aspects, API 310 may include ISP(s) 316. ISP(s) 316 may perform operations related to, as examples, noise reduction, resolution upscaling, various image correction protocols, de-mosaicing, color space conversion, pixel interpolation, automatic exposure control (AEC), automatic gain control (AGC), contrast detect autofocus (CDAF), phase detect autofocus (PDAF), automatic white balance, merging of image frames to form an HDR image. ISP(s) 316 may be, or may include, one or more processors. Additionally, or alternatively, ISP(s) 316 may be, or may include, one or more image or signal processing algorithms that may be implemented in any processor. In some cases, ISP(s) 316 may include multiple individual processors or algorithms that may all process the data from cameras 304. In some cases, ISP(s) 316 may include processors or algorithms for each of cameras 304.

API 310 may control cameras 304 and/or ISP(s) 316 based on settings 318. Settings 318 may include image-capture setting and/or image-processing settings. For example, API 310 may control one or more of cameras 304 based on image-capture settings of settings 318. Additionally, or alternatively. API 310 may control one or more operations of ISP(s) 316 based on image-processing settings of settings 318.

For example, API 310 may enable applications 308 to transition between cameras 304. For example, API 310 may provide image data to application 308*a* from camera 304*a* (e.g., wide-angle camera) then transition to providing image data from camera 304*b* (e.g., a telephoto camera). API 310 may cause the transition to be smooth. For example, API 310 may receive data (e.g., image data) output by two or more of cameras 304 and determine one or more settings 318 for operation of cameras 304 based on the data. For example, based on image data from camera 304*a*, camera 304*b*, and/or camera 304*c*, the API 310 may determine settings 318 related to ISO, exposure time, aperture size, focus, gain, AEC, AWB, AF, and/or combinations thereof. API 310 may control one of more of cameras 304 according to the determined settings 318. For example, API 310 may control settings of camera 304*a* based on inputs from application 308*a*. Additionally, API 310 may control settings of camera 304*b* and/or camera 304*c* based on settings 318 (e.g., such that if application 308*a* requests a transition from receiving image data from camera 304*a* to receiving image data from camera 304*b*, camera 304*b* is configured to provide image data that is related, such is in terms of brightness and/or focus, to the image data being provided by camera 304*a*).

As another example, API 310 may determine settings 318 based on requests from application 308*a* and/or based on how API 310 is controlling one of cameras 304 for one of applications 308. For example, API 310 may control camera 304*a* based on requests from application 308*a*. Further, while controlling camera 304*a*, API 310 may determine settings 318 for camera 304*b* and/or camera 304*c* based on the settings used to control camera 304*a*. Further, API 310 may control camera 304*b* and/or camera 304*c* based on settings 318 (e.g., even if application 308*a* is not receiving data from camera 304*b* and/or camera 304*c*). Then in response to a request from application 308*a* (e.g., a zoom request), API 310 may transition application 308*a* from receiving image data from camera 304*a* to receive image data from camera 304*b*. Because camera 304*b* is already being controlled based on settings 318, the transition may be smooth (e.g., the last image from camera 304*a* may be similar, such as in terms of brightness and/or focus, to the first image from camera 304*b*).

API 310 may include arbiter 314. Arbiter 314 may be, or may include one or more routines, algorithms, or processes implemented in software running on one or more processors of device 302. Arbiter 314 may be implemented in, or as part of, API 310. Arbiter 314 may arbitrate between applications 308 as applications 308 seek to control cameras 304. In other words, arbiter 314 may manage control of cameras 304 by applications 308. Arbiter 314 may arbitrate according to guidelines to allow multiple ones of applications 308 to control multiple respective ones of cameras 304. In the present disclosure, references to an application controlling a camera may refer to the API controlling the camera according to requests or instructions from the application. For example, application 308*a* may request image data captured using a certain exposure time. API 310 may control camera 304*a* to capture the requested image data according to the requested exposure time. For brevity, this transaction between application 308*a*, API 310, and camera 304*a* may be described as application 308*a* controlling camera 304*a*.

As an example of contemplated operation of arbiter 314, arbiter 314 may allow a first of applications 308 that requests one of cameras 304 control of the one of cameras 304. For example, application 308*a* may request to control one of cameras 304. The request may relate to a particular one of cameras 304, for example, the request may include a zoom setting or a surface of device 302. One of cameras 304 (e.g., camera 304*a*) may be capable of the zoom setting or be on the surface. In such cases, API 310 may grant application 308*a* control of camera 304*a*. In other cases, the request may not relate to a particular one of cameras 304 or may relate to multiple ones of cameras 304. In such cases, API 310 may determine to grant application 308*a* control of one of cameras 304 based on some other criteria such as, for example, a use case, a default, or comparative power consumed by each of cameras 304.

According to various aspects of the present disclosure, arbiter 314 may allow one or more others of applications 308 to control one or more others of cameras 304. For example, while application 308a is controlling camera 304a, if application 308b requests image data, or control of one of cameras 304, arbiter 314 may grant application 308b control of one of camera 304b or camera 304c. Further, if application 308c requests to control one of cameras 304, arbiter 314 may grant application 308c control over the other of application 308b and application 308c (e.g., the one not controlled by application 308b). Arbiter 314 may manage control of cameras 304 by tracking data such as the data illustrated in Table 1.

| Cameras 304 | Controller |
|---|---|
| Camera 304a | Application 308a |
| Camera 304b | Application 308b |
| Camera 304c | Available |

In this way, API 310 (using arbiter 314) may allow multiple ones of applications 308 to use multiple respective ones of cameras 304 at the same time. This may enable a more efficient use of cameras 304. Further, this may be preferable to a user that may wish to have two or more of applications 308 controlling two or more respective ones of cameras 304. For example, this may allow a user to participate in a video call using a front camera while capturing an image using a back camera.

In some cases, arbiter 314 may determine which of applications 308 to allow to control which of cameras 304 based on primacy (e.g., based on which of applications 308 requested first). For example, if application 308a is controlling camera 304a (e.g., based on 308a having been the first of applications 308 to request control of one of cameras 304), subsequent ones of applications 308 requesting control of one of cameras 304 may be granted control of an unused camera (e.g., camera 304b or camera 304c). As another example, a first application launched may have priority over later-launched applications.

In some cases, arbiter 314 may determine which of applications 308 to allow to control which of cameras 304 based on priority (e.g., based on a table, such as a priority lookup table describing which applications have priority over which other applications). For example, arbiter 314 may include, or have access to, a priority table (e.g., the priority lookup table). OS 306 may provide input to, or govern, the priority table. The priority table may describe which of applications 308 has priority over which others with regard to controlling cameras 304. Further, the priority table may describe conditions for the priority. For example, some applications 308 may have priority with regard to certain ones of cameras 304 and not others. For example, a video call or streaming application may have priority over a camera application with regard to a front camera but not with regard to a read camera. As another example, a barcode-reading application may have priority over a video-chat application with regard to rear cameras, but the video chat application may have priority over the barcode reading application with regard to front cameras. According to the priority table, arbiter 314 may determine whether to grant a second-to-request application control over a camera over an application that is using the camera. For example, if application 308a (e.g., a video-chat application) is using camera 304a, and application 308b (e.g., a camera application) requests control over camera 304a, arbiter 314 may determine which of the application 308a and application 308b to grant control over camera 304a. Table 2 is an example priority table.

|  | First Priority | Second Priority | Third Priority |
|---|---|---|---|
| Camera 304a | Application 308a | Application 308b | Application 308c |
| Camera 304b | Application 308b | Application 308c | Application 308a |
| Camera 304c | Application 308c | Application 308a | Application 308b |

Figure 4:
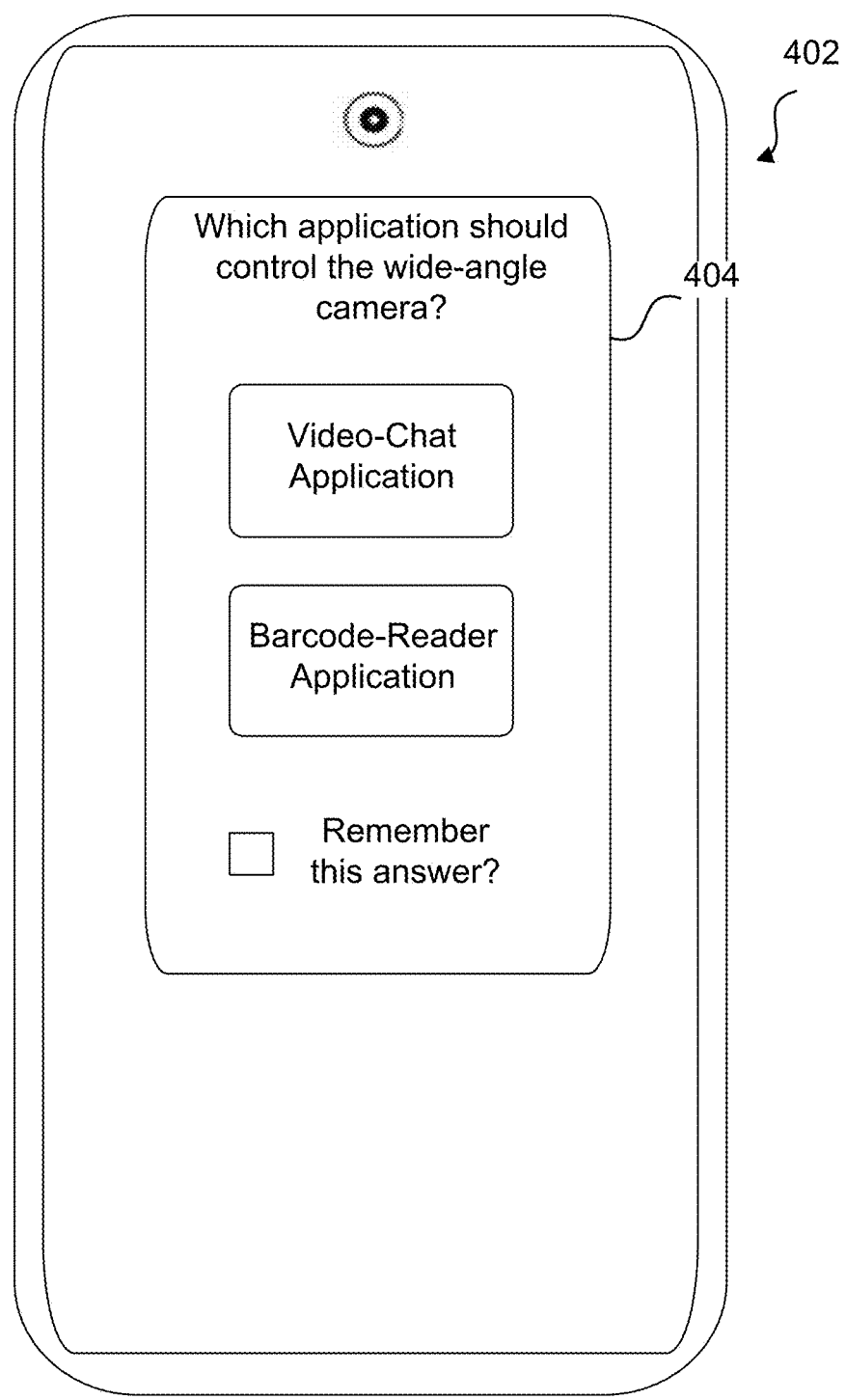
FIG. 4 illustrates an example query that may be provided to a user of device, according to various aspects of the present disclosure.

Arbiter 314 may determine what to do when an application is not granted the control it requested or when control is revoked (whether based on primacy or priority). For example, if application 308b is denied control of camera 304a, arbiter 314 may determine what to do (e.g., what response to provide application 308b). For example, arbiter 314 may determine to provide a notification regarding a reason why the request was denied. Further, arbiter 314 may determine to provide alternate suggestions (e.g., suggestions of other cameras that are available for use). Or if application 308b is granted control of camera 304a and control of camera 304a is taken from application 308a, arbiter 314 may determine what to do (e.g., what to do for application 308a). In some cases, arbiter 314 may simply not provide the image data, or cease providing the image data, and not control any of cameras 304 based on requests from the denied application. In other cases, arbiter 314 may generate a query regarding the conflict (e.g., "which of application 308a and application 308b should be granted control of camera 304a") and provide the query to OS 306 or to a user of device 302. Arbiter 314 may store the answer (or offer to store the answer) to settle future conflicts. For example, FIG. 4 illustrates an example query 404 that may be provided to a user of device 402, according to various aspects of the present disclosure.

In other cases, arbiter 314 may allow the denied application control of another of cameras 304. For example, if application 308b is denied control of camera 304a (e.g., based on application 308a already controlling camera 304a and/or based on application 308a having a higher priority than application 308b with regard to camera 304a), arbiter 314 may grant (or offer to grant) application 308b control of camera 304b. Arbiter 314 may include, or have access to, a preference table (e.g., a lookup table). OS 306 may provide input to, or govern, the preference table. The preference table may include preferred cameras for each of applications 308. For example, the preference table may include an indication that application 308b prefers camera 304a, then camera 304b, then camera 304c. Accordingly, when application 308b requests control of one of cameras 304, arbiter 314 may first check whether camera 304a is controlled by another application. If it is, arbiter 314 may then check whether camera 304b is controlled by another application and, if it is not, arbiter 314 may grant application 308b control over camera 304b. Table 3 is an example of a preference table.

|  | First Preference | Second Preference | Third Preference |
|---|---|---|---|
| Application 308a | Application 308a | Application 308c | Application 308b |
| Application 308b | Application 308a | Application 308b | Application 308c |
| Application 308c | Application 308c | Application 308a | Application 308b |

Figure 5A:
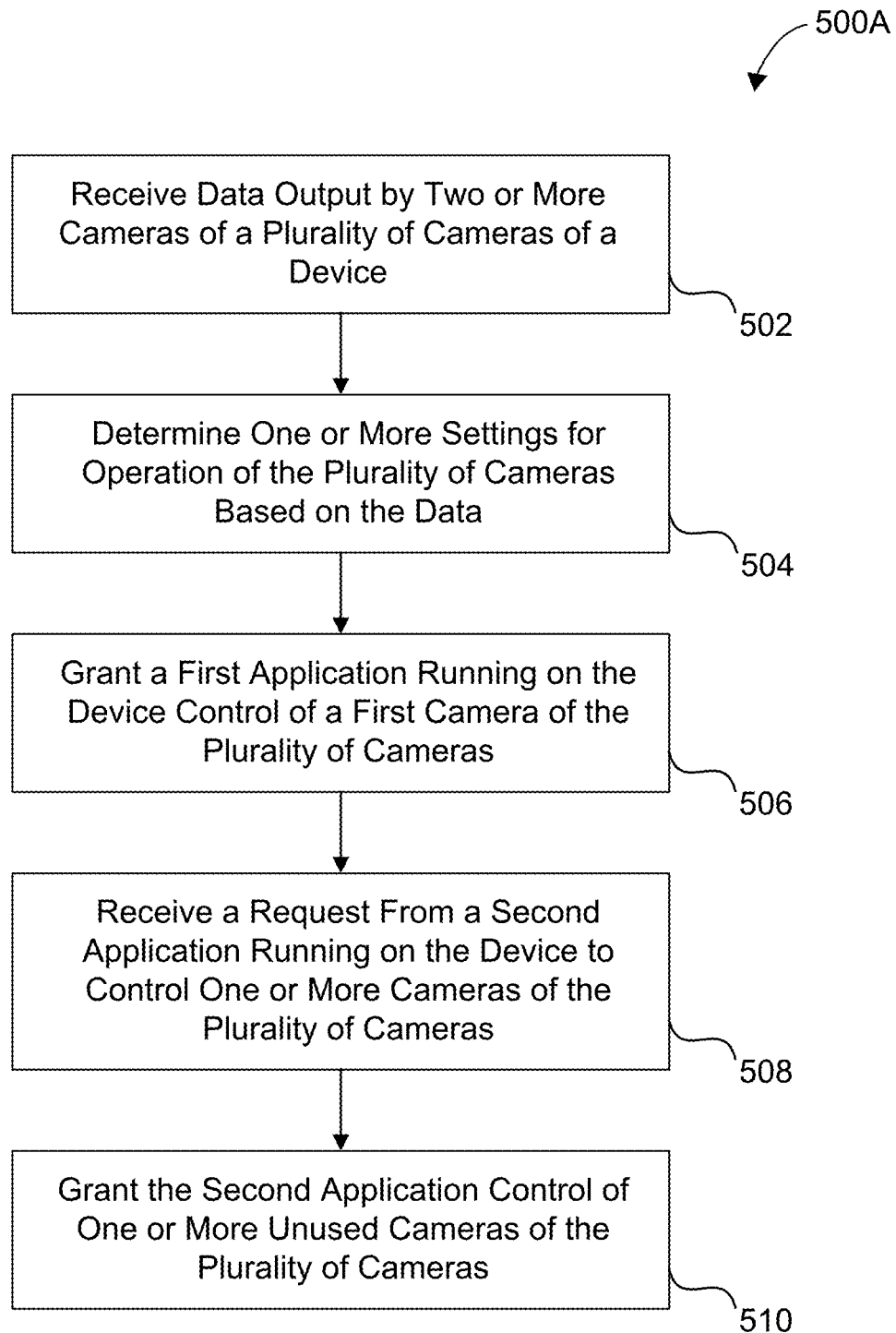
FIG. 5A is a flow diagram illustrating an example process for managing control of cameras, in accordance with aspects of the present disclosure.

FIG. 5A is a flow diagram illustrating a process 500A for managing control of cameras, in accordance with aspects of the present disclosure. One or more operations of process 500A may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 500A. The one or more operations of process 500A may be implemented as software components that are executed and run on one or more processors.

At a block 502, a computing device (or one or more components thereof) may receive data output by two or more cameras of a plurality of cameras of a device. For example, API 310 of FIG. 3 may receive data output by two or more of cameras 304.

At a block 504, the computing device (or one or more components thereof) may determine one or more settings for operation of the plurality of cameras based on the data. For example, API 310 may determine one or more settings for operating cameras 304.

In some aspects, the wherein the one or more settings may be associated with at least one of: ISO value, exposure time, aperture size, lens defocus value, exposure gain, focus window, color temperature, color channel gains, automatic exposure control (AEC), automatic white balance (AWB), and/or automatic focus (AF).

At a block 506, the computing device (or one or more components thereof) may grant a first application running on the device control of a first camera of the plurality of cameras. For example, API 310 may grant application 308a control over camera 304a.

At a block 508, the computing device (or one or more components thereof) may receive a request from a second application running on the device to control one or more cameras of the plurality of cameras. For example, API 310 may receive a request from application 308b to control one of cameras 304.

At a block 510, the computing device (or one or more components thereof) may grant the second application control of one or more unused cameras of the plurality of cameras. For example, API 310 may grant application 308b control of camera 304b.

In some aspects, granting the first application control of the first camera may be, or may include, granting the first application control over image-capture settings of the first camera. Further, granting the second application control of the one or more unused cameras may be, or may include, granting the second application control over image-capture settings of the one or more unused cameras. In some aspects, process 500A may be performed by an API (e.g., API 310).

In some aspects, the computing device (or one or more components thereof) may receive a request from a third application to control one or more cameras of the plurality of cameras; and grant the third application control of one or more unused cameras of the plurality of cameras. For example, API 310 may receive a request from application 308c to control one of cameras 304. Responsive to the request, API 310 may grant application 308c control of camera 304c.

In some aspects, the computing device (or one or more components thereof) may determine that the second application has priority over the first application to control the first camera; and based on the second application having priority over the first application to control the first camera, deny the first application control of the first camera and granting the second application control of the first camera. For example, API 310 may determine that application 308b has priority over application 308a to control camera 304a. Based on application 308b having priority over application 308a relative to camera 304a, API 310 may deny application 308a control of camera 304a and grant application 308b control of camera 304a. In some aspects, the computing device (or one or more components thereof) may grant the first application control of another camera of the plurality of cameras. For example, after API 310 denies application 308a control of camera 304a, API 310 may grant application 308a control of camera 304b.

In some aspects, the determination that the second application has priority to control the first camera over the first application is based on a priority table. For example API 310 may store a priority table. In some aspects, the determination that the second application has priority to control the first camera over the first application is based on a query provided to a user. For example, query 404 may be provided to a user and the determination may be made based on a response to query 404.

In some aspects, the one or more settings may be one or more first settings. The computing device (or one or more components thereof) may further, prior to granting the first application control of the first camera, grant the first application control of a second camera of the plurality of cameras; prior to granting the first application control of the first camera, control the second camera based on one or more second settings; responsive to a request from the first application to control the first camera, grant the first application control of the first camera; and control the first camera based on the one or more second settings.

For example, API 310 may grant application 308a control of camera 304b. API 310, may control camera 304b according to second settings (e.g., based on instructions from application 308a). Responsive to a request, API 310 may grant application 308a control of camera 304a. API 310 may control camera 304a based on the second settings. For example, API 310 may implement zoom-transition handling.

Figure 5B:
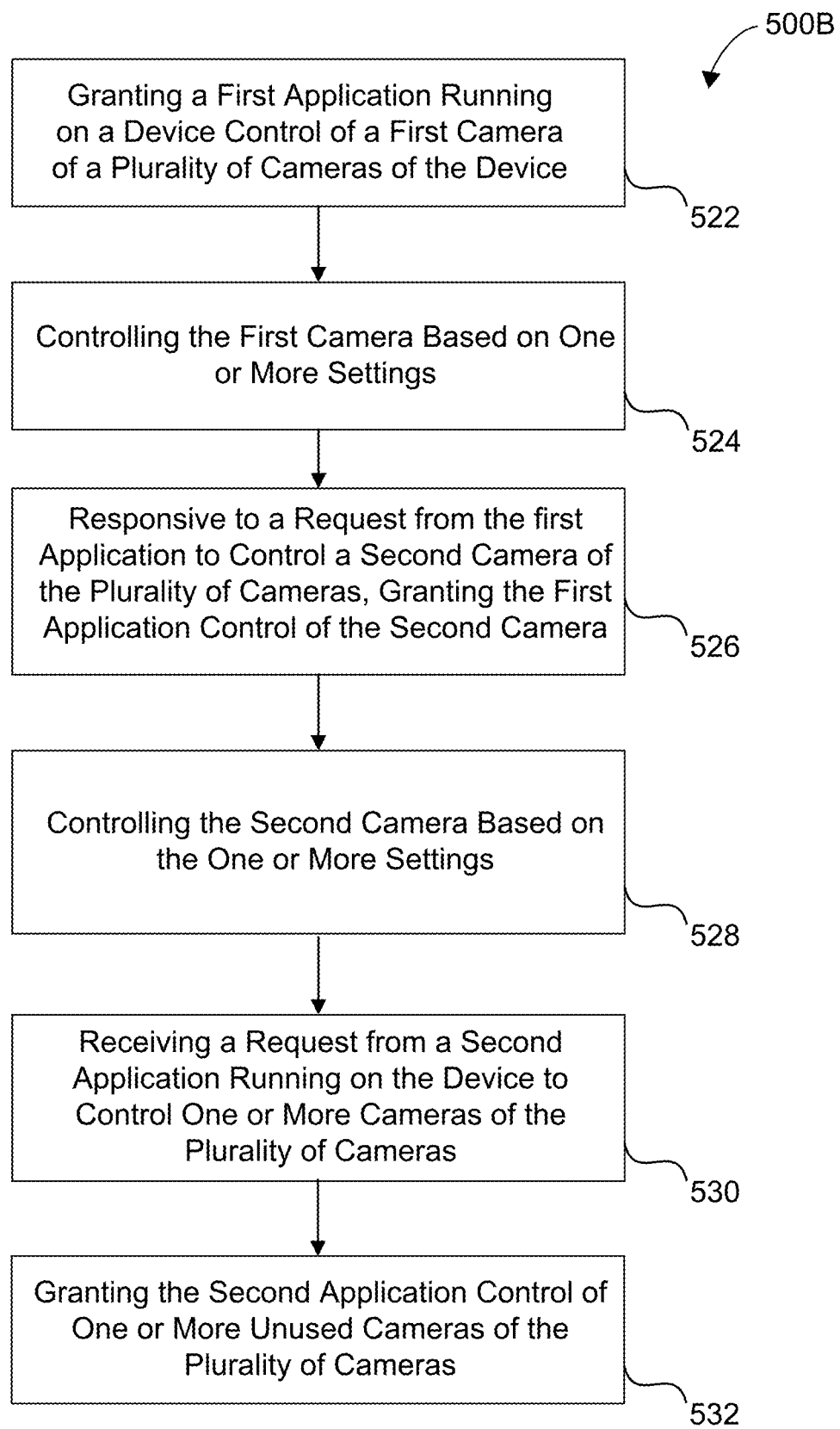
FIG. 5B is a flow diagram illustrating another example process for managing control of cameras, in accordance with aspects of the present disclosure.

FIG. 5B is a flow diagram illustrating a process 500B for managing control of cameras, in accordance with aspects of the present disclosure. One or more operations of process 500B may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 500B. The one or more operations of process 500B may be implemented as software components that are executed and run on one or more processors.

At a block 522, a computing device (or one or more components thereof) may grant a first application running on a device control of a first camera of a plurality of cameras of the device.

At a block 524, the computing device (or one or more components thereof) may control the first camera based on one or more settings.

In some aspects, the wherein the one or more settings may be associated with at least one of: ISO value, exposure time, aperture size, lens defocus value, exposure gain, focus window, color temperature, color channel gains, automatic exposure control (AEC), automatic white balance (AWB), and/or automatic focus (AF).

At a block 526, the computing device (or one or more components thereof) may be responsive to a request from the first application to control a second camera of the plurality of cameras, grant the first application control of the second camera.

At a block 528, the computing device (or one or more components thereof) may control the second camera based on the one or more settings At a block 530, the computing device (or one or more components thereof) may receive a request from a second application running on the device to control one or more cameras of the plurality of cameras.

At a block 532, the computing device (or one or more components thereof) may grant the second application control of one or more unused cameras of the plurality of cameras.

In some aspects, granting the first application control of the first camera may be, or may include, granting the first application control over image-capture settings of the first camera. Further, granting the second application control of the one or more unused cameras may be, or may include, granting the second application control over image-capture settings of the one or more unused cameras. In some aspects, process 500B may be performed by an API (e.g., API 310).

In some aspects, the computing device (or one or more components thereof) may receive a request from a third application to control one or more cameras of the plurality of cameras; and grant the third application control of one or more unused cameras of the plurality of cameras. For example, API 310 may receive a request from application 308c to control one of cameras 304. Responsive to the request, API 310 may grant application 308c control of camera 304c.

In some aspects, the computing device (or one or more components thereof) may determine that the second application has priority over the first application to control the first camera; and based on the second application having priority over the first application to control the first camera, deny the first application control of the first camera and granting the second application control of the first camera. For example, API 310 may determine that application 308b has priority over application 308a to control camera 304a. Based on application 308b having priority over application 308a relative to camera 304a, API 310 may deny application 308a control of camera 304a and grant application 308b control of camera 304a. In some aspects, the computing device (or one or more components thereof) may grant the first application control of another camera of the plurality of cameras. For example, after API 310 denies application 308a control of camera 304a, API 310 may grant application 308a control of camera 304b.

In some aspects, the determination that the second application has priority to control the first camera over the first application is based on a priority table. For example API 310 may store a priority table. In some aspects, the determination that the second application has priority to control the first camera over the first application is based on a query provided to a user. For example, query 404 may be provided to a user and the determination may be made based on a response to query 404.

In some aspects, the one or more settings comprise one or more first settings. The computing device (or one or more components thereof) may further receive data output by two or more cameras of a plurality of cameras of a device; and determine one or second more settings for operation of the plurality of cameras based on the data. For example, API 310 may receive data from cameras 304 and may determine second settings based on the data received from cameras 304.

In some examples, as noted previously, the methods described herein (e.g., process 500A of FIG. 5A, process 500B of FIG. 5B, and/or other methods described herein) can be performed, in whole or in part, by a computing device or apparatus. In one example, one or more of the methods can be performed by device 202 of FIG. 2A and FIG. 2B, device 302 of FIG. 3, OS 306 of FIG. 3, API 310 of FIG. 3, arbiter 314 of FIG. 3, or by another system or device. In another example, one or more of the methods (e.g., process 500A of FIG. 5A, process 500B of FIG. 5B, and/or other methods described herein) can be performed, in whole or in part, by the computing-device architecture 600 shown in FIG. 6. For instance, a computing device with the computing-device architecture 600 shown in FIG. 6 can include, or be included in, the components of the device 202 of FIG. 2A and FIG. 2B, device 302 of FIG. 3, OS 306 of FIG. 3, API 310 of FIG. 3, arbiter 314 of FIG. 3 and can implement the operations of process 500A, process 500B and/or other process described herein. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component(s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 500A, process 500B, and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 500A, process 500B, and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

FIG. 6 illustrates an example computing-device architecture 600 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing-device architecture 600 may include, implement, or be included in any or all of device 202 of FIG. 2A and FIG. 2B, device 302 of FIG. 3, OS 306 of FIG. 3, API 310 of FIG. 3, arbiter 314 of FIG. 3.

The components of computing-device architecture 600 are shown in electrical communication with each other using connection 612, such as a bus. The example computing-device architecture 600 includes a processing unit (CPU or processor) 602 and computing device connection 612 that couples various computing device components including computing device memory 610, such as read only memory (ROM) 608 and random-access memory (RAM) 606, to processor 602.

Computing-device architecture 600 can include a cache of high-speed memory connected directly with, in close proximity to, or integrated as part of processor 602. Computing-device architecture 600 can copy data from memory 610 and/or the storage device 614 to cache 604 for quick access by processor 602. In this way, the cache can provide a performance boost that avoids processor 602 delays while waiting for data. These and other modules can control or be configured to control processor 602 to perform various actions. Other computing device memory 610 may be available for use as well. Memory 610 can include multiple different types of memory with different performance characteristics. Processor 602 can include any general-purpose processor and a hardware or software service, such as service 1 616, service 2 618, and service 3 620 stored in storage device 614, configured to control processor 602 as well as a special-purpose processor where software instructions are incorporated into the processor design. Processor 602 may be a self-contained system, containing multiple cores or processors, a bus, memory controller, cache, etc. A multi-core processor may be symmetric or asymmetric.

To enable user interaction with the computing-device architecture 600, input device 622 can represent any number of input mechanisms, such as a microphone for speech, a touch-sensitive screen for gesture or graphical input, keyboard, mouse, motion input, speech and so forth. Output device 624 can also be one or more of a number of output mechanisms known to those of skill in the art, such as a display, projector, television, speaker device, etc. In some instances, multimodal computing devices can enable a user to provide multiple types of input to communicate with computing-device architecture 600. Communication interface 626 can generally govern and manage the user input and computing device output. There is no restriction on operating on any particular hardware arrangement and therefore the basic features here may easily be substituted for improved hardware or firmware arrangements as they are developed.

Storage device 614 is a non-volatile memory and can be a hard disk or other types of computer readable media which can store data that are accessible by a computer, such as magnetic cassettes, flash memory cards, solid state memory devices, digital versatile disks, cartridges, random-access memories (RAMs) 606, read only memory (ROM) 608, and hybrids thereof. Storage device 614 can include services 616, 618, and 620 for controlling processor 602. Other hardware or software modules are contemplated. Storage device 614 can be connected to the computing device connection 612. In one aspect, a hardware module that performs a particular function can include the software component stored in a computer-readable medium in connection with the necessary hardware components, such as processor 602, connection 612, output device 624, and so forth, to carry out the function.

The term "substantially," in reference to a given parameter, property, or condition, may refer to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, magnetic or optical disks, USB devices provided with non-volatile memory, networked storage devices, any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X. Y, and Z such that together the multiple processors perform X, Y, and Z; or that a group of multiple processors work together to perform operations X. Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Claim language or other language reciting "at least one processor configured to," "at least one processor being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X. Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A method for managing control of cameras, the method comprising: receiving data output by two or more cameras of a plurality of cameras of a device; determining one or more settings for operation of the plurality of cameras based on the data; granting a first application running on the device control of a first camera of the plurality of cameras; receiving a request from a second application running on the device to control one or more cameras of the plurality of cameras; and granting the second application control of one or more unused cameras of the plurality of cameras.

Aspect 2. The method of aspect 1, wherein the method is performed by an application programming interface (API) that manages control of the plurality of cameras of the device.

Aspect 3. The method of any one of aspects 1 or 2, wherein the one or more settings are associated with at least one of: ISO value; exposure time; aperture size; lens defocus value; exposure gain; focus window; color temperature; color channel gains; automatic exposure control (AEC); automatic white balance (AWB); or automatic focus (AF).

Aspect 4. The method of any one of aspects 1 to 3, wherein the one or more settings comprise one or more first settings, wherein the method further comprises: prior to granting the first application control of the first camera, granting the first application control of a second camera of the plurality of cameras; prior to granting the first application control of the first camera, controlling the second camera based on one or more second settings; responsive to a request from the first application to control the first camera, granting the first application control of the first camera; and controlling the first camera based on the one or more second settings.

Aspect 5. The method of any one of aspects 1 to 4, wherein granting the first application control of the first camera comprises granting the first application control over image-capture settings of the first camera and wherein granting the second application control of the one or more unused cameras comprises granting the second application control over image-capture settings of the one or more unused cameras.

Aspect 6. The method of any one of aspects 1 to 5, further comprising: receiving a request from a third application to control one or more cameras of the plurality of cameras; and granting the third application control of one or more unused cameras of the plurality of cameras.

Aspect 7. The method of any one of aspects 1 to 6, further comprising: determining that the second application has priority over the first application to control the first camera; and based on the second application having priority over the first application to control the first camera, denying the first application control of the first camera and granting the second application control of the first camera.

Aspect 8. The method of aspect 7, wherein the determination that the second application has priority to control the first camera over the first application is based on a priority table.

Aspect 9. The method of any one of aspects 7 or 8, wherein the determination that the second application has priority to control the first camera over the first application is based on a query provided to a user.

Aspect 10. The method of any one of aspects 7 to 9, further comprising granting the first application control of another camera of the plurality of cameras.

Aspect 11. A method for managing control of cameras, the method comprising: granting a first application running on a device control of a first camera of a plurality of cameras of the device; controlling the first camera based on one or more settings; responsive to a request from the first application to control a second camera of the plurality of cameras, granting the first application control of the second camera; controlling the second camera based on the one or more settings; receiving a request from a second application running on the device to control one or more cameras of the plurality of cameras; and granting the second application control of one or more unused cameras of the plurality of cameras.

Aspect 12. The method of aspect 11, wherein the method is performed by an application programming interface (API) that manages control of the plurality of cameras of the device.

Aspect 13. The method of any one of aspects 11 or 12, wherein the one or more settings are related to at least one of: ISO value; exposure time; aperture size; lens defocus value; exposure gain; focus window; color temperature; color channel gains; automatic exposure control (AEC); automatic white balance (AWB); or automatic focus (AF).

Aspect 14. The method of any one of aspects 11 to 13, wherein the one or more settings comprise one or more first settings, wherein the method further comprises: receiving data output by two or more cameras of a plurality of cameras of a device; and determining one or second more settings for operation of the plurality of cameras based on the data.

Aspect 15. The method of any one of aspects 11 to 14, wherein granting the first application control of the first camera comprises granting the first application control over image-capture settings of the first camera and wherein granting the second application control of the one or more unused cameras comprises granting the second application control over image-capture settings of the one or more unused cameras.

Aspect 16. The method of any one of aspects 11 to 15, further comprising: receiving a request from a third application to control one or more cameras of the plurality of cameras; and granting the third application control of one or more unused cameras of the plurality of cameras.

Aspect 17. The method of any one of aspects 11 to 16, further comprising: determining that the second application has priority to control the first camera over the first application; denying the first application control of the first camera; and granting the second application control of the first camera.

Aspect 18. The method of aspect 17, wherein the determination that the second application has priority to control the first camera over the first application is based on a priority table.

Aspect 19. The method of any one of aspects 17 or 18, wherein the determination that the second application has priority to control the first camera over the first application is based on a query provide to a user.

Aspect 20. The method of any one of aspects 17 to 19, further comprising granting the first application control of another camera of the plurality of cameras.

Aspect 21. An apparatus for managing control of cameras, the apparatus comprising: at least one memory; and at least one processor coupled to the at least one memory and configured to: receive data output by two or more cameras of a plurality of cameras of a device; determine one or more settings for operation of the plurality of cameras based on the data; grant a first application running on the device control of a first camera of the plurality of cameras; receive a request from a second application running on the device to control one or more cameras of the plurality of cameras; and grant the second application control of one or more unused cameras of the plurality of cameras.

Aspect 22. The apparatus of aspect 21, wherein the at least one processor is configured to implement an application programming interface (API) that manages control of the plurality of cameras of the device.

Aspect 23. The apparatus of any one of aspects 21 or 22, wherein, to grant the first application control of the first camera, the at least one processor is further configured to grant the first application control over image-capture settings of the first camera and wherein, to grant the second application control of the one or more unused cameras, the at least one processor is further configured to grant the second application control over image-capture settings of the one or more unused cameras.

Aspect 24. The apparatus of any one of aspects 21 to 23, wherein the at least one processor is further configured to: receive a request from a third application to control one or more cameras of the plurality of cameras; and grant the third application control of one or more unused cameras of the plurality of cameras.

Aspect 25. The apparatus of any one of aspects 21 to 24, wherein the at least one processor is further configured to: determine that the second application has priority over the first application to control the first camera; and based on the second application having priority over the first application to control the first camera, deny the first application control of the first camera and granting the second application control of the first camera.

Aspect 26. An apparatus for managing control of cameras, the apparatus comprising: at least one memory; and at least one processor coupled to the at least one memory and configured to: grant a first application running on a device control of a first camera of a plurality of cameras of the device; control the first camera based on one or more settings; responsive to a request from the first application to control a second camera of the plurality of cameras, granting the first application control of the second camera; control the second camera based on the one or more settings; receive a request from a second application running on the device to control one or more cameras of the plurality of cameras; and grant the second application control of one or more unused cameras of the plurality of cameras.

Aspect 27. The apparatus of aspect 26, wherein the at least one processor is configured to implement an application programming interface (API) that manages control of the plurality of cameras of the device.

Aspect 28. The apparatus of any one of aspects 26 or 27, wherein, to grant the first application control of the first camera, the at least one processor is further configured to grant the first application control over image-capture settings of the first camera and wherein to grant the second application control of the one or more unused cameras, the at least one processor is further configured to grant the second application control over image-capture settings of the one or more unused cameras.

Aspect 29. The apparatus of any one of aspects 26 to 28, wherein the at least one processor is further configured to: receive a request from a third application to control one or more cameras of the plurality of cameras; and grant the third application control of one or more unused cameras of the plurality of cameras.

Aspect 30. The apparatus method of any one of aspects 26 to 29, wherein the at least one processor is further configured to: determine that the second application has priority to control the first camera over the first application; deny the first application control of the first camera; and grant the second application control of the first camera.

What is claimed is:

1. A method for managing control of cameras, the method comprising:
   receiving data output by two or more cameras of a plurality of cameras of a device;
   determining one or more settings for operation of the plurality of cameras based on the data;
   granting a first application running on the device control of a first camera of the plurality of cameras;
   receiving a request from a second application running on the device to control one or more cameras of the plurality of cameras; and
   granting the second application control of one or more unused active cameras of the plurality of cameras while the first application maintains control of the first camera.

2. The method of claim 1, wherein the method is performed by an application programming interface (API) that manages control of the plurality of cameras of the device.

3. The method of claim 1, wherein the one or more settings are associated with at least one of:
   ISO value;
   exposure time;
   aperture size;
   lens defocus value;
   exposure gain;
   focus window;
   color temperature;
   color channel gains;
   automatic exposure control (AEC);
   automatic white balance (AWB); or
   automatic focus (AF).

4. The method of claim 1, wherein the one or more settings comprise one or more first settings, wherein the method further comprises:
   prior to granting the first application control of the first camera, granting the first application control of a second camera of the plurality of cameras;
   prior to granting the first application control of the first camera, controlling the second camera based on one or more second settings;
   responsive to a request from the first application to control the first camera, granting the first application control of the first camera; and
   controlling the first camera based on the one or more second settings.

5. The method of claim 1, wherein granting the first application control of the first camera comprises granting the first application control over image-capture settings of the first camera and wherein granting the second application control of the one or more unused active cameras comprises granting the second application control over image-capture settings of the one or more unused active cameras.

6. The method of claim 1, further comprising:
   receiving a request from a third application to control one or more cameras of the plurality of cameras; and
   granting the third application control of one or more unused active cameras of the plurality of cameras.

7. The method of claim 1, further comprising:
   determining that the second application has priority over the first application to control the first camera; and
   based on the second application having priority over the first application to control the first camera, denying the first application control of the first camera and granting the second application control of the first camera.

8. The method of claim 7, wherein the determination that the second application has priority to control the first camera over the first application is based on a priority table.

9. The method of claim 7, wherein the determination that the second application has priority to control the first camera over the first application is based on a query provided to a user.

10. The method of claim 7, further comprising granting the first application control of another camera of the plurality of cameras.

11. A method for managing control of cameras, the method comprising:
   granting a first application running on a device control of a first camera of a plurality of cameras of the device;
   controlling the first camera based on one or more settings;
   responsive to a request from the first application to control a second camera of the plurality of cameras, granting the first application control of the second camera;
   controlling the second camera based on the one or more settings;
   receiving a request from a second application running on the device to control one or more cameras of the plurality of cameras; and
   granting the second application control of one or more unused active cameras of the plurality of cameras while the first application maintains control of the first camera.

12. The method of claim 11, wherein the method is performed by an application programming interface (API) that manages control of the plurality of cameras of the device.

13. The method of claim 11, wherein the one or more settings are related to at least one of:
   ISO value;
   exposure time;
   aperture size;
   lens defocus value;
   exposure gain;
   focus window;
   color temperature;
   color channel gains;
   automatic exposure control (AEC);
   automatic white balance (AWB); or
   automatic focus (AF).

14. The method of claim 11, wherein the one or more settings comprise one or more first settings, wherein the method further comprises:
   receiving data output by two or more cameras of a plurality of cameras of a device; and
   determining one or second more settings for operation of the plurality of cameras based on the data.

15. The method of claim 11, wherein granting the first application control of the first camera comprises granting the first application control over image- capture settings of the first camera and wherein granting the second application control of the one or more unused active cameras comprises granting the second application control over image- capture settings of the one or more unused active cameras.

16. The method of claim 11, further comprising:
   receiving a request from a third application to control one or more cameras of the plurality of cameras; and
   granting the third application control of one or more unused active cameras of the plurality of cameras.

17. The method of claim 11, further comprising:
   determining that the second application has priority to control the first camera over the first application;
   denying the first application control of the first camera; and
   granting the second application control of the first camera.

18. The method of claim 17, wherein the determination that the second application has priority to control the first camera over the first application is based on a priority table.

19. The method of claim 17, wherein the determination that the second application has priority to control the first camera over the first application is based on a query provide to a user.

20. The method of claim 11, further comprising granting the first application control of another camera of the plurality of cameras.

21. An apparatus for managing control of cameras, the apparatus comprising:
   at least one memory; and
   at least one processor coupled to the at least one memory and configured to:
      receive data output by two or more cameras of a plurality of cameras of a device;
      determine one or more settings for operation of the plurality of cameras based on the data;
      grant a first application running on the device control of a first camera of the plurality of cameras;
      receive a request from a second application running on the device to control one or more cameras of the plurality of cameras; and
      grant the second application control of one or more unused active cameras of the plurality of cameras while the first application maintains control of the first camera.

22. The apparatus of claim 21, wherein the at least one processor is configured to implement an application programming interface (API) that manages control of the plurality of cameras of the device.

23. The apparatus of claim 21, wherein, to grant the first application control of the first camera, the at least one processor is further configured to grant the first application control over image-capture settings of the first camera and wherein, to grant the second application control of the one or more unused active cameras, the at least one processor is further configured to grant the second application control over image-capture settings of the one or more unused active cameras.

24. The apparatus of claim 21, wherein the at least one processor is further configured to:
   receive a request from a third application to control one or more cameras of the plurality of cameras; and
   grant the third application control of one or more unused active cameras of the plurality of cameras.

25. The apparatus of claim 21, wherein the at least one processor is further configured to:
   determine that the second application has priority over the first application to control the first camera; and
   based on the second application having priority over the first application to control the first camera, deny the first application control of the first camera and granting the second application control of the first camera.

26. An apparatus for managing control of cameras, the apparatus comprising:
   at least one memory; and
   at least one processor coupled to the at least one memory and configured to:
      grant a first application running on a device control of a first camera of a plurality of cameras of the device;
      control the first camera based on one or more settings;
      responsive to a request from the first application to control a second camera of the plurality of cameras, granting the first application control of the second camera;
      control the second camera based on the one or more settings;
      receive a request from a second application running on the device to control one or more cameras of the plurality of cameras; and grant the second application control of one or more unused active cameras of the plurality of cameras while the first application maintains control of the first camera.

27. The apparatus of claim 26, wherein the at least one processor is configured to implement an application programming interface (API) that manages control of the plurality of cameras of the device.

28. The apparatus of claim 26, wherein, to grant the first application control of the first camera, the at least one processor is further configured to grant the first application control over image-capture settings of the first camera and wherein to grant the second application control of the one or more unused active cameras, the at least one processor is further configured to grant the second application control over image-capture settings of the one or more unused active cameras.

29. The apparatus of claim 26, wherein the at least one processor is further configured to:
receive a request from a third application to control one or more cameras of the plurality of cameras; and
grant the third application control of one or more unused active cameras of the plurality of cameras.

30. The apparatus of claim 26, wherein the at least one processor is further configured to:
determine that the second application has priority to control the first camera over the first application;
deny the first application control of the first camera; and
grant the second application control of the first camera.

* * * * *